United States Patent [19]

Tamura et al.

[11] Patent Number: 5,004,352
[45] Date of Patent: Apr. 2, 1991

[54] PLASTICIZING SCREW

[75] Inventors: Yukio Tamura; Kiyoshi Kinoshita; Tetsuo Uwaji; Takashi Mizuno, all of Nagoya, Japan

[73] Assignee: Mitsubishi Jukogyo Kabushiki Kaisha, Tokyo, Japan

[21] Appl. No.: 356,604

[22] Filed: May 23, 1989

Related U.S. Application Data

[63] Continuation of Ser. No. 126,962, Nov. 30, 1987, abandoned.

[30] Foreign Application Priority Data

May 25, 1987 [JP] Japan .................. 62-127322

[51] Int. Cl.$^5$ ..................... B29B 1/04; B01F 7/08
[52] U.S. Cl. ........................ 366/343; 366/79
[58] Field of Search ............ 366/79, 81, 82, 89, 366/90, 318, 319, 322, 323, 324, 325, 328; 425/207, 208, 209

[56] References Cited

U.S. PATENT DOCUMENTS

| | | | |
|---|---|---|---|
| 3,698,541 | 10/1972 | Barr | 425/208 |
| 3,719,351 | 3/1973 | Upmeier | 366/82 |
| 3,721,427 | 3/1973 | Upmeier | 366/82 |
| 3,941,535 | 3/1976 | Street | 366/90 |
| 4,000,884 | 1/1977 | Chung | 366/322 |
| 4,154,536 | 5/1979 | Sokolow | 366/90 |
| 4,171,196 | 10/1979 | Maillefer | 366/81 |
| 4,277,182 | 7/1981 | Kruder | 425/208 |
| 4,321,229 | 3/1982 | Blakeslee, III et al. | 366/90 |
| 4,639,143 | 1/1987 | Frankland, Jr. | 366/322 |

FOREIGN PATENT DOCUMENTS

| | | | |
|---|---|---|---|
| 52060 | 8/1936 | Denmark | 366/79 |
| 3519291 | 12/1986 | Fed. Rep. of Germany | |
| 17-12232 | 7/1942 | Japan | |
| 50-35863 | 4/1975 | Japan | |
| 50-87167 | 7/1975 | Japan | |
| 81567 | 7/1978 | Japan | 366/81 |
| 52166 | 4/1979 | Japan | 366/90 |
| 56-115239 | 9/1981 | Japan | |
| 56-156633 | 11/1981 | Japan | |
| 202835 | 11/1984 | Japan | 366/79 |
| WO86/06325 | 6/1986 | World Int. Prop. O. | |

Primary Examiner—Robert W. Jenkins
Attorney, Agent, or Firm—Wenderoth, Lind & Ponack

[57] ABSTRACT

A plasticizing screw for an injection molding machine or the like having one or more lands in a crest portion of a screw flight to prevent the screw flight from coming into contact with a cylinder wall surface when the plasticizing screw is rotated during a molding operation. The land has a smaller diameter than that of a crest portion of the screw flight and is provided at the screw flight crest portion either between leading and trailing surfaces of the screw flight or extending from the leading edge of the screw flight. The land can also be provided as a plurality of circumferentially spaced-apart lands on the side of a front surface of the screw flight, or provided at a central portion between the leading and trailing surfaces of the screw flight.

34 Claims, 13 Drawing Sheets

II BARRIER ENDING SECTION
III BARRIER SECTION
I BARRIER BEGINNING SECTION

PRESSURE DISTRIBUTION
PMAX

PRESSURE DISTRIBUTION
(PRESSURE)

PLASTICIZING SCREW

This application is a continuation of now abandoned application, Ser. No. 126,962 filed on Nov. 30, 1987.

BACKGROUND OF THE INVENTION

1. Field of the Invention

The present invention relates to a plasticizing screw that is available in an injection molding machine for plastic and rubber, an extruder, a plasticizing device for foods, a kneading machine, etc., and in some cases a barrier type screw is employed as the plasticizing screw.

2. Description of the Prior Art

In general, for a plasticizing screw it is required to melt various raw material resin, homogeneously knead and disperse it, and stably extrude it under various operating conditions. Referring now to FIG. 23 which shows a common molding machine screw in the prior art, this screw is divided into a solid transporting section A for transporting solid in a resin plasticizing process, a plasticizing section B and a metering section C. Normally, in these sections of the screw is used a full flight screw in which one or a plurality of flights 2 are provided spirally around a column-shaped screw main body 1 as shown in FIGS. 24 and 25 (a developed view of a screw). In addition, even a screw not called "full flight" such as a barrier screw or a Dalmage type screw has a flight-like protrusion so as to form a groove for passing resin and to support a screw main body by a cylinder wall surface. In the prior art, a crest portion of such a flight or flight-like protrusion (hereinafter called simply "flight") was formed of a cylindrical surface that was identical in the circumferential direction.

However, in the case of the flight having the heretofore known configuration, behavior of a screw within a cylinder would vary depending upon the type of raw material resin and an operating condition of a molding machine, and a lubrication effect between a flight crest portion and a cylinder wall surface would be extremely deteriorated. More particularly, there may possibly occur a phenomenon wherein the screw revolves under an eccentric condition at a period equal to about $\frac{1}{2}$ of a rotational period of the screw, and at this time, with the flight having the heretofore known configuration, a lubrication pressure would be almost not generated between a flight crest portion and a cylinder wall. Accordingly, often the flight crest portion and the cylinder wall surface come into direct contact with each other and friction is generated. Consequently, a stable extrusion operation could not be achieved due to the fact that damage of a screw and a cylinder as well as deterioration of extruded material occurred.

Different configurations of various barrier type screws in the prior art are shown respectively in FIGS. 26(A) to 26(E) in side views. In these examples of the screws in the prior art, a flight width in a beginning section I and an ending section II of a barrier portion is identical to a width of either a main flight or a dam flight, or even if it has a broader width, a circumferential length of the flight in the broad width portion was as short as less than a one-half circumference.

In the case of the plasticizing screw in the prior art, there were problems that depending upon a kind of raw material resin and an operating condition, a behavior of the screw would vary, resulting in extreme deterioration of a lubricating effect, abrasion would be generated, and a cylinder was damaged.

In addition, in the case of the barrier type screw, a principal object of this design is to separate solid phase resin and liquid phase resin from each other as shown in FIG. 27 or in FIG. 28. Owing to the effect of this design, solid phase resin is prevented from advancing up to a tip end of the screw, resulting in enhancement of homogeneity of extruded material, and the so-called break-up phenomenon of a solid bed in which solid phase resin becomes unable to maintain continuity can be prevented, so that this design is effective for preventing biting abrasion of the screw accompanying debubbling, extrusion variation and variation of a pressure within a screw which is caused by passage of solid phase and liquid phase in blocks.

There were problems in that in the barrier section, while solid phase and liquid phase are separated from each other as described above, generally in most cases, a pressure in the liquid phase resin is extremely low with respect to a pressure in the solid phase resin, and in that in the barrier beginning or ending section, since a proportion of a solid side groove width to a melt side groove width changes abruptly, unbalance would arise in the forces acting upon a screw outer circumference at this section, hence the screw is pushed in one direction. Especially, in the ending section where a pressure difference is large, this tendency becomes large, consequently the screw becomes eccentric and comes into contact with an inner surface of a cylinder, and so biting abrasion is liable to occur in the neighborhood of the portion on the opposite side to the terminal portion of the solid side groove with respect to the screw axis.

It is to be noted that at this moment the screw does not wear over its entire circumference but rather it has a tendency to wear unevenly. In addition, in the case of contemplating to realize a high capability with a barrier type screw, it becomes necessary to increase a surface area of a solid groove, that is, the area coming into contact with a cylinder inner surface to melt resin, and as shown in FIG. 29, at a terminal end (b) of a barrier, a variation rate of a width of a solid groove 203 tends to increase. Moreover, there is a tendency that a feeding capability of solid phase resin, that is, a pressure of solid resin is contemplated to be raised by machining a longitudinal groove on an inner surface of a cylinder corresponding to a screw base portion, that is, a raw material feed portion. This would result in an increase of the above-mentioned biting abrasion which occurs at a terminal end portion of a barrier.

In the case where a melt groove width (a) is narrow in the barrier inlet portion, liquid phase resin can hardly advance towards the tip end, hence separation between liquid phase resin and solid phase resin cannot be effected smoothly and a functional effect inherent to a barrier type screw cannot be obtained. Therefore, in many cases the melt groove width in this portion is made broad. This causes unbalanced loading in the inlet portion to be apt to occur. FIG. 30 shows distribution of a resin pressure P along the cross-section F—F in FIG. 29.

As described above, when realization of a high capability is contemplated with a barrier type screw, in many cases, biting abrasion of the screw at the beginning and ending portions of a barrier would become a neck point. Especially, in the case where a screw length subsequent to the barrier portion is short, there was a problem in that the screw length which bears against this unbalanced loading became short and this biting abrasion was liable to occur.

SUMMARY OF THE INVENTION

It is therefore one object of the present invention to provide an improved plasticizing screw which is free from the above-described shortcomings in the prior art.

According to one feature of the present invention, in a plasticizing screw a land having a smaller diameter than that of a crest portion of a screw flight is provided at the screw flight crest portion so that the screw flight crest portion does not come into contact with a cylinder wall surface upon rotation of the screw. The above-mentioned land is provided preferably on the side of a front surface of the screw flight with respect to the direction of rotation of the screw flight, or at a central portion of the screw flight.

According to another feature of the present invention, in a barrier type plasticizing screw a land having a smaller diameter than that of a crest portion of a screw flight is provided at the screw flight crest portion so that the screw flight crest portion does not come into contact with a cylinder wall surface. The above-mentioned land in a barrier type plasticizing screw is provided preferably in a beginning section and/or an ending section of a barrier.

According to the present invention, due to the provision of the above-mentioned land at the screw flight crest portion, a lubrication capability under a normal operating condition would not be lost in any event, that is, even under such an operating condition of a screw that a lubrication pressure is hardly generated with a configuration of a flight crest portion in the prior art which is formed with the same cylindrical surface along the circumferential direction, a relatively large lubrication pressure is generated in the neighborhood of the closest point between the flight crest portion and the cylinder wall surface, and thereby direct contact between the flight crest portion and the cylinder wall surface can be prevented.

Moreover, according to the present invention, due to the fact that in a barrier type plasticizing screw a land is provided at a screw flight crest portion in a beginning section and/or an ending section of a barrier, the land being varied from a smaller diameter to a larger diameter along the direction of rotation, a fluid lubrication pressure in these portions can be maintained. In addition, it is preferable to provide this broad width portion over a length of one-half the circumference or more from a melt groove beginning portion or a solid groove ending portion and, if possible, over a length of one circumference or more. Thereby, a large fluid lubrication pressure that is not realized by the plasticizing screw in the prior art, can be generated in the barrier beginning and ending sections, and hence an eccentricity of the screw caused by an unbalanced force generated in these portions can be made small, or a loading force acting against the unbalanced force can be generated.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1A:
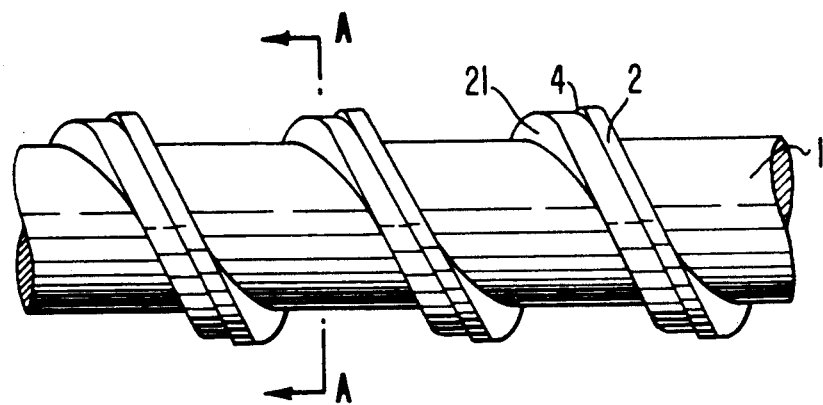
FIGS. 1(a) and (b) are side views of a screw according to a first preferred embodiment of the present invention with a flat land and a tapered land, respectively.
Figure 1B:
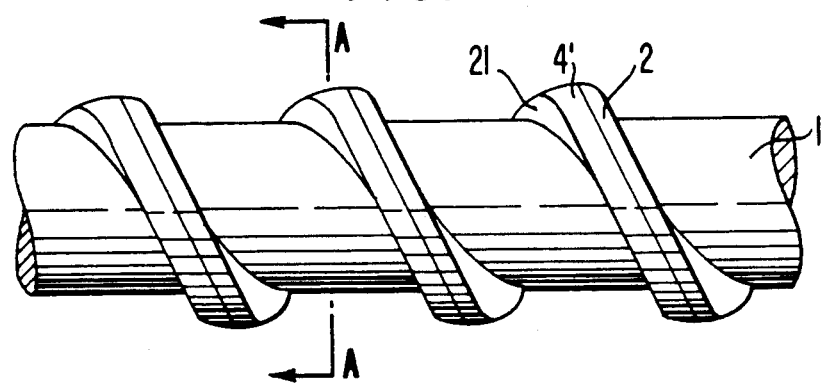
Figure 2:
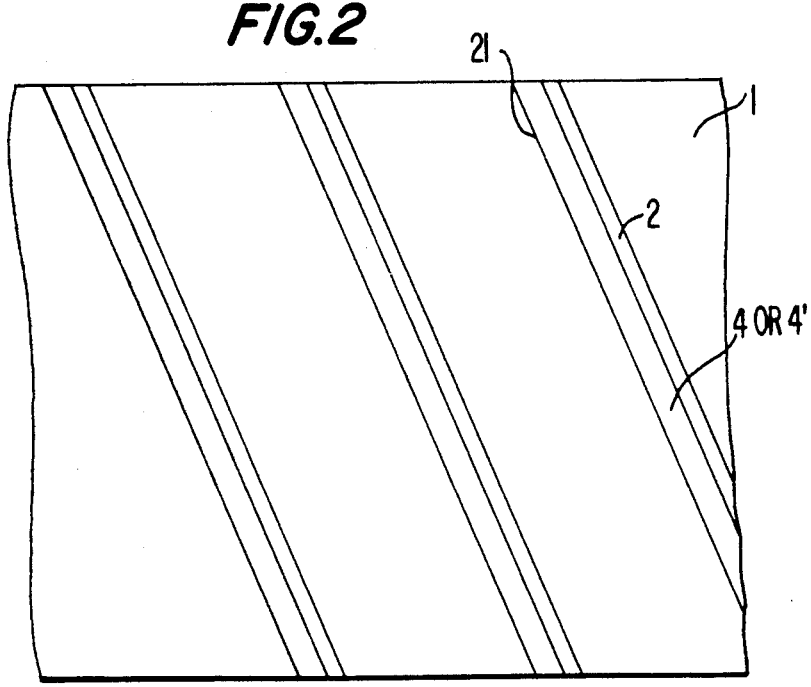
FIG. 2 is a developed view of the screw in FIG. 1.
Figure 3:
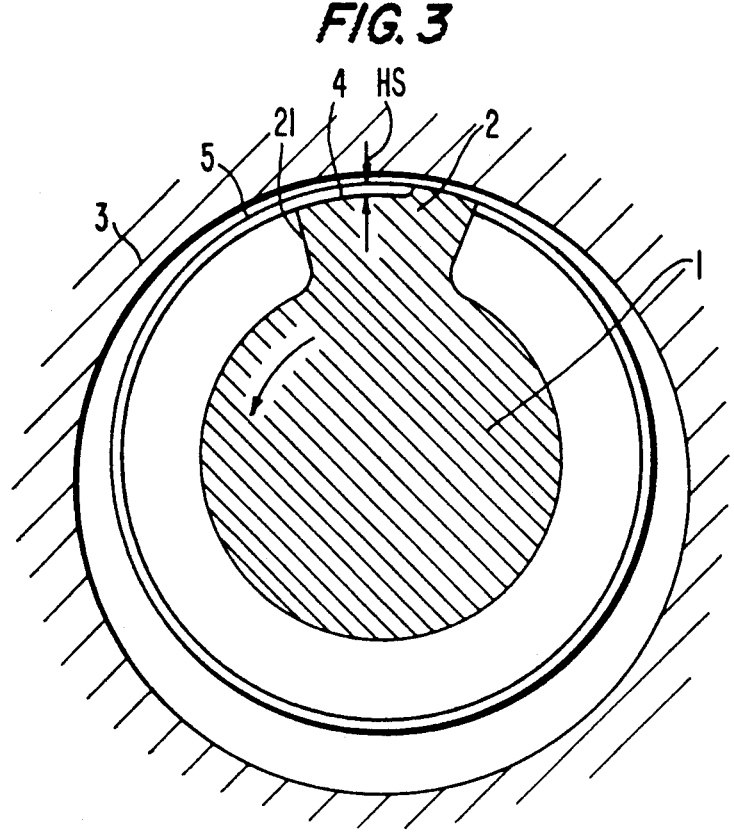
FIGS. 3 and 4 are cross-section views respectively showing two alternative cross-section configurations taken along line A—A in FIG. 1.
Figure 4:
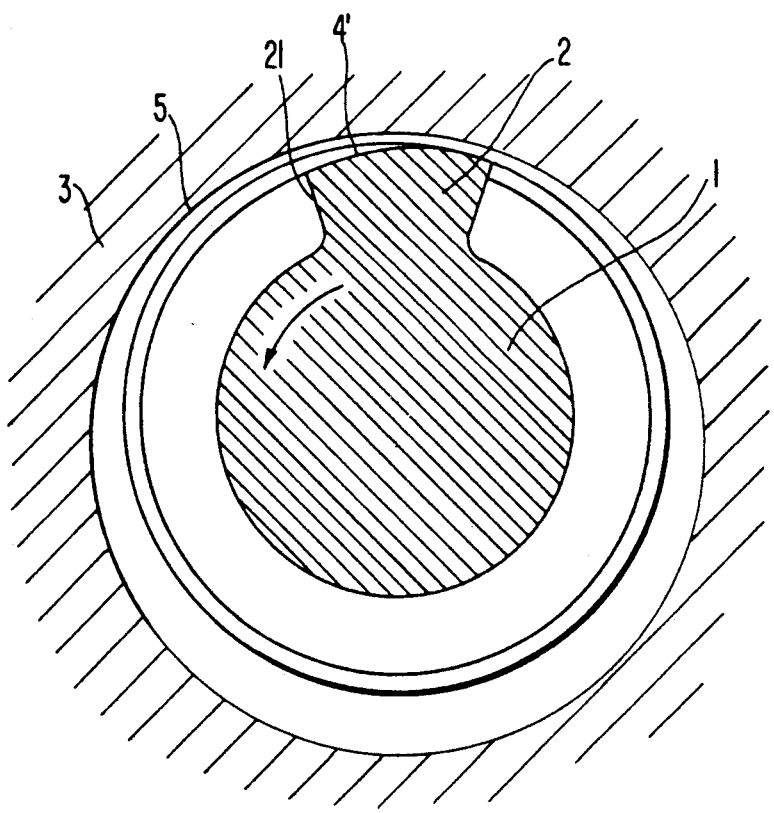

Now the present invention will be explained in connection with the preferred embodiments illustrated in the accompanying drawings. A first preferred embodiment of the invention is shown in FIG. 1, and two alternative cross-section configurations taken along line A—A in FIG. 1 are shown in FIGS. 3 and 4, respectively. As shown in FIG. 1(a) and FIG. 3, in a screw flight 2, a flat land 4 comprising a recess having a cross-section configuration formed by a reduced diameter of a leading edge of the flight appearing as an arcuated curve having a somewhat smaller diameter than a screw outer diameter 5 and in parallel to the outer diameter 5, is provided on a flight crest portion (a surface of the screw flight confronting the internal surface of the cylinder) on the side of a front (leading) surface 21 of the flight with respect to the direction of rotation of the screw. In all the embodiments of the present invention, the land has a circumferential width taken in a plane perpendicular to the rotation axis of the screw which is greater than one-half the overall circumferential width between the leading and trailing surfaces of the crest portion of the screw flight. FIG. 1(b) and FIG. 4 show a modification of the first preferred embodiment, in which on a flight crest portion on the side of a front surface 21 of the flight with respect to the direction of rotation of the screw is provided a land 4' which has a moderate inclination with respect to a screw outer diameter circle 5 formed by an increasing dianmeter of the leading edge of the flight which continues at its terminal end to the outer diameter 5.

A screw 1 rotates in the direction of an arrow in FIG. 3. While the flight 2 is rotating, when it becomes about to come into contact with a wall surface of a cylinder 3, between the flight crest portion and the cylinder wall surface is generated a lubrication pressure of molten resin due to the land 4 or 4', and thereby the flight 2 is prevented from coming into contact with the wall surface of the cylinder 3. According to our experiments conducted for a molding machine screw of about 90 mm in diameter, it was confirmed that the effect of generating a lubrication pressure is large if a dimension $h_s$ of the land in FIG. 3 is is about 0.5 mm.

Figure 5A:
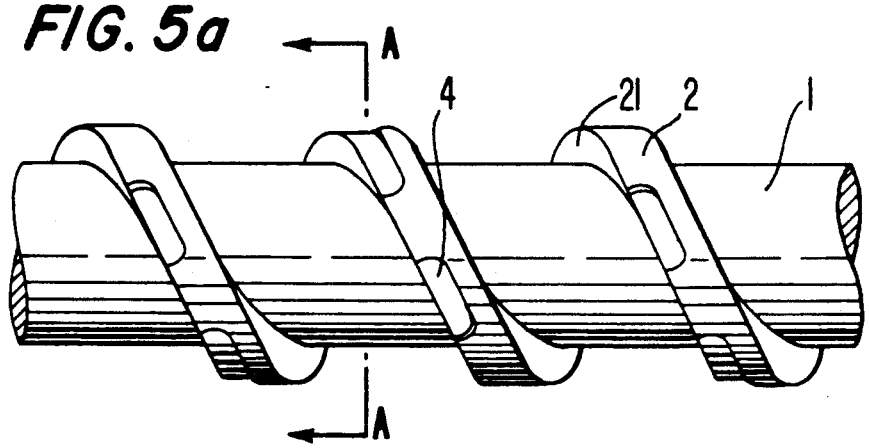
FIG. 5(a) and 5(b) are side views of a screw according to a second preferred embodiment of the present invention with spaced-apart flat lands and tapered lands, respectively.
Figure 5B:
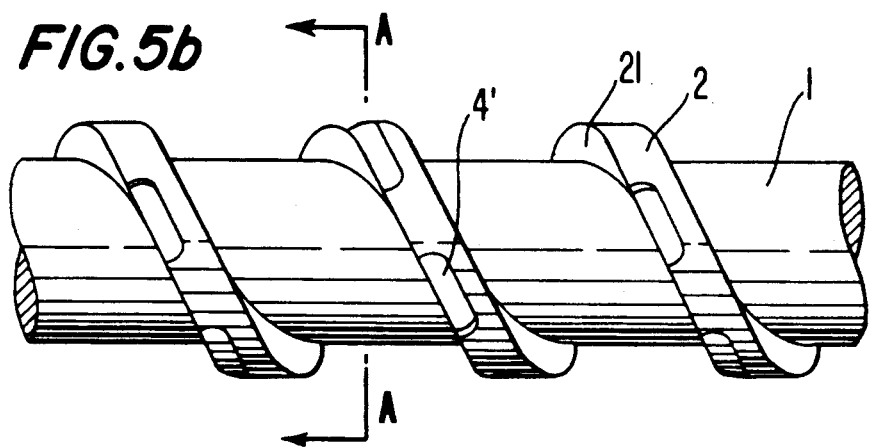
Figure 6:
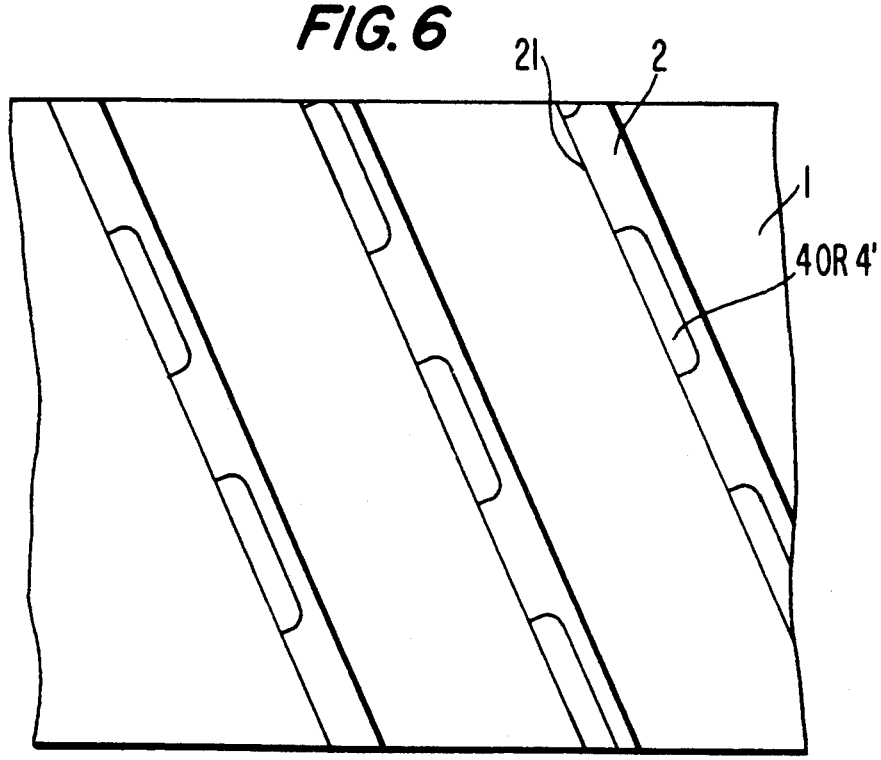
FIG. 6 is a developed view of the screw in FIG. 5.

A second preferred embodiment of the present invention is illustrated in FIGS. 5(a) and 5(b), in which the land 4 or 4' shown in FIGS. 3 or 4, respectively, is provided intermittently as spaced-apart lands located along the helical periphery on a flight crest portion in partial sections of the screw. FIG. 6 shows the same screw in a developed view.

Figure 7A:
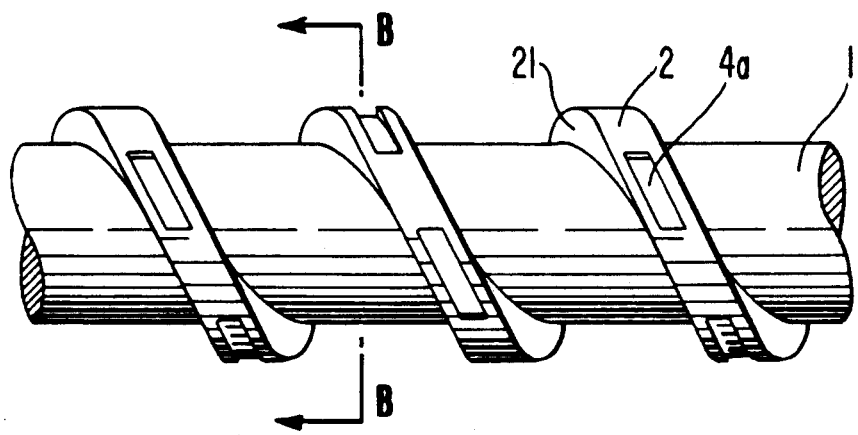
FIG. 7(a) and 7(b) are side views of a screw according to a third preferred embodiment of the present invention with spaced-apart flat lands and tapered lands, respectively.
Figure 7B:
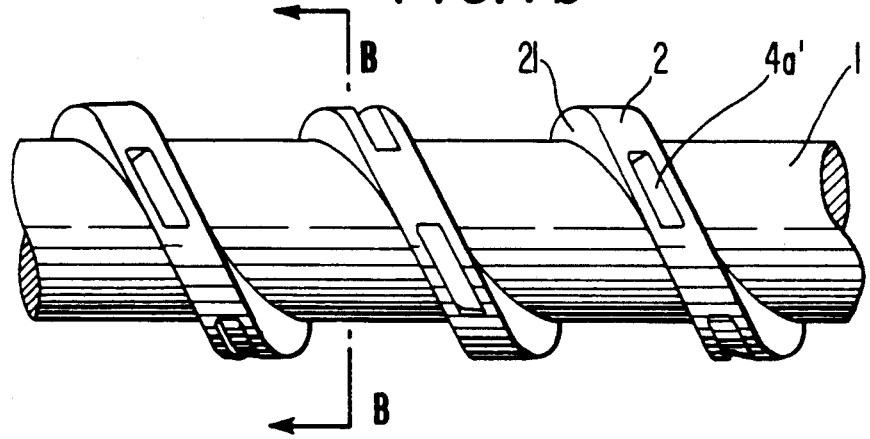
Figure 8:
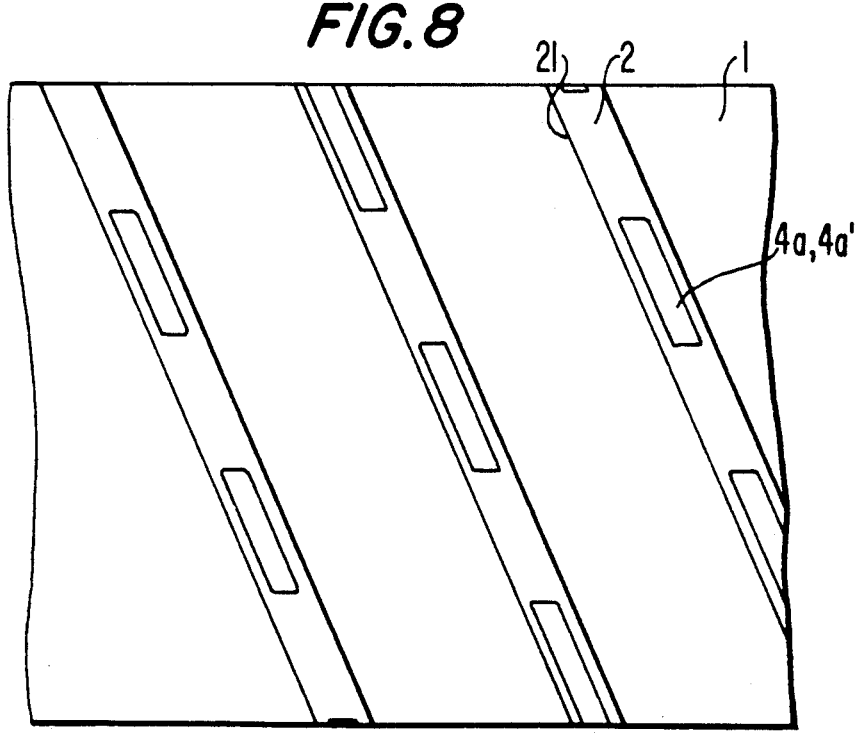
FIG. 8 is a developed view of the screw in FIG. 7.
Figure 9:
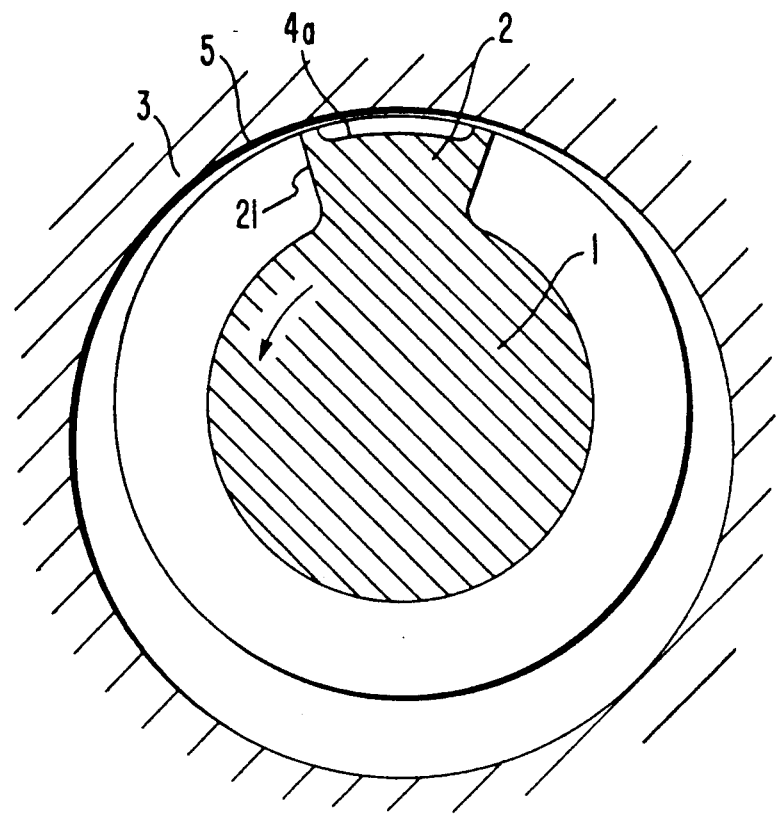
FIGS. 9 and 10 are cross-section views respectively showing two alternative cross-section configurations taken along line B—B in FIG. 7.
Figure 10:
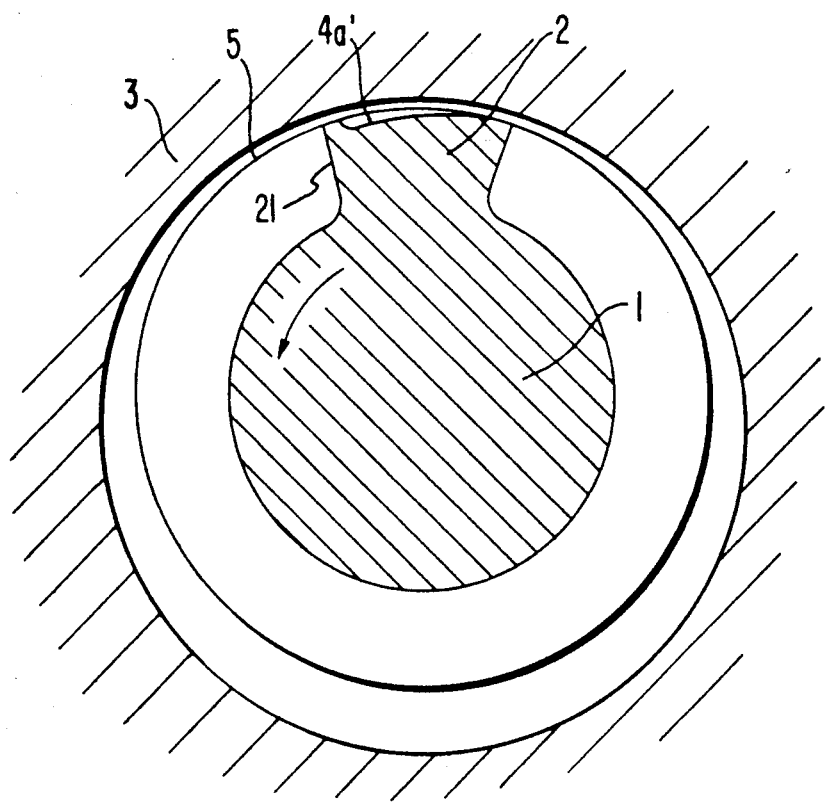

A third preferred embodiment of the present invention is illustrated in FIGS. 7(a) and 7(b), in which a flight crest portion has a land 4a located inwardly of the leading and trailing surfaces of the screw flight or 4a' of the shape shown in FIGS. 9 or 10, respectively, and this land 4a or 4a' is provided intermittently as helically spaced-apart lands of constant depth (FIG. 9) or tapered depth (FIG. 10); on a crest portion of a screw flight. It is to be noted that this land 4a or 4a' could be provided either continuously over the entire length of the flight crest portion of the screw or only at desired locations intermittently or continuously.

Figure 11A:
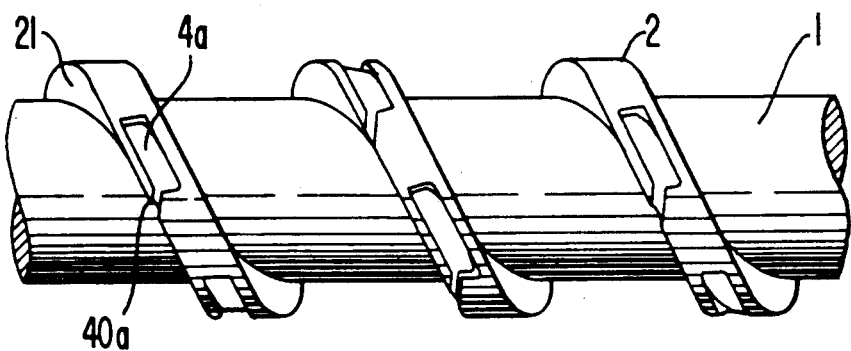
FIG. 11(a) and 11(b) are side views of a screw according to a fourth preferred embodiment of the present invention with flat lands and tapered lands, respectively.
Figure 11B:
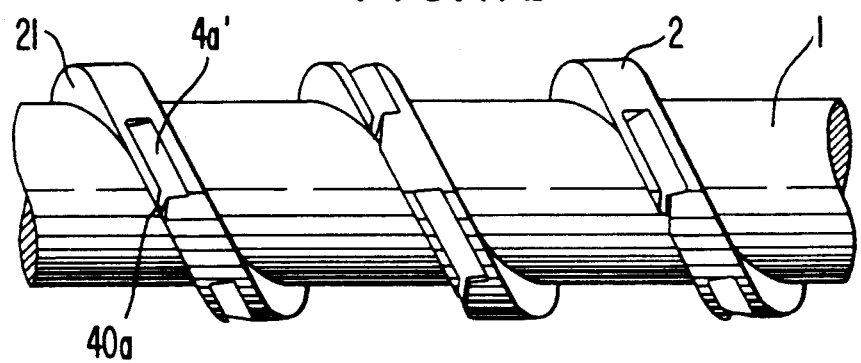
Figure 12:
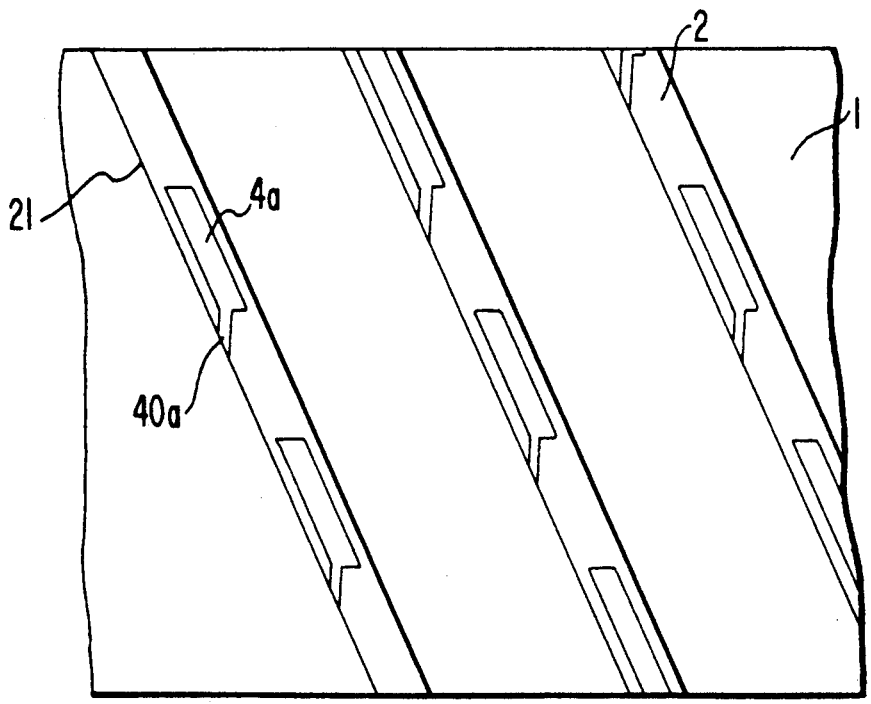
FIG. 12 is a developed view of the screw in FIG. 11.

A fourth preferred embodiment of the present invention, in which lands are provided which are similar to those provided in the third preferred embodiment shown in FIGS. 9 and 10 are shown in FIGS. 11(a), 11(b) and 12 in side views and a developed view, respectively. The only difference from the third preferred embodiment resides in that an inflow groove 40a for communicating the resin with the recessed land 4a or 4a' is provided on a leading edge of the flight crest portion on the side of a front surface 21 of the flight.

Figure 13A:
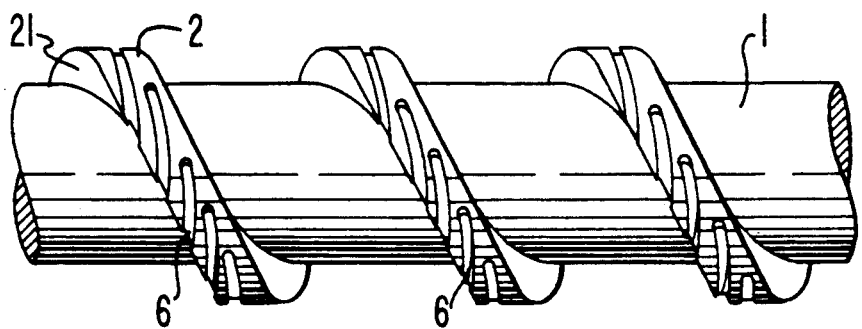
FIG. 13(a) and 13(b) are side views of a screw according to a fifth preferred embodiment of the present invention with flat lands and tapered lands, respectively.
Figure 13B:
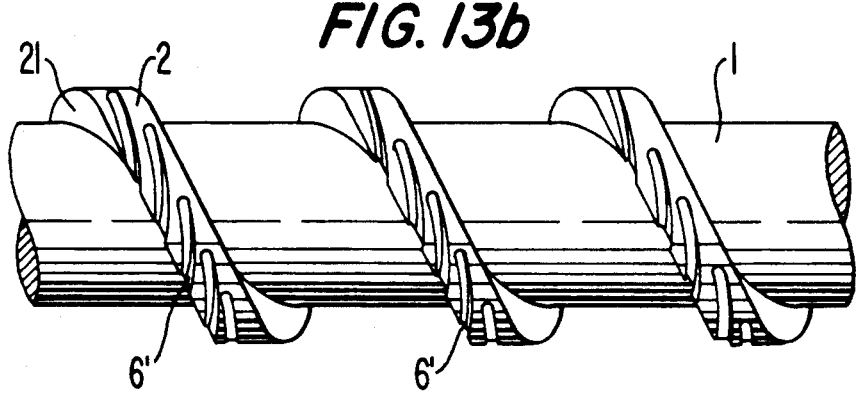
Figure 14:
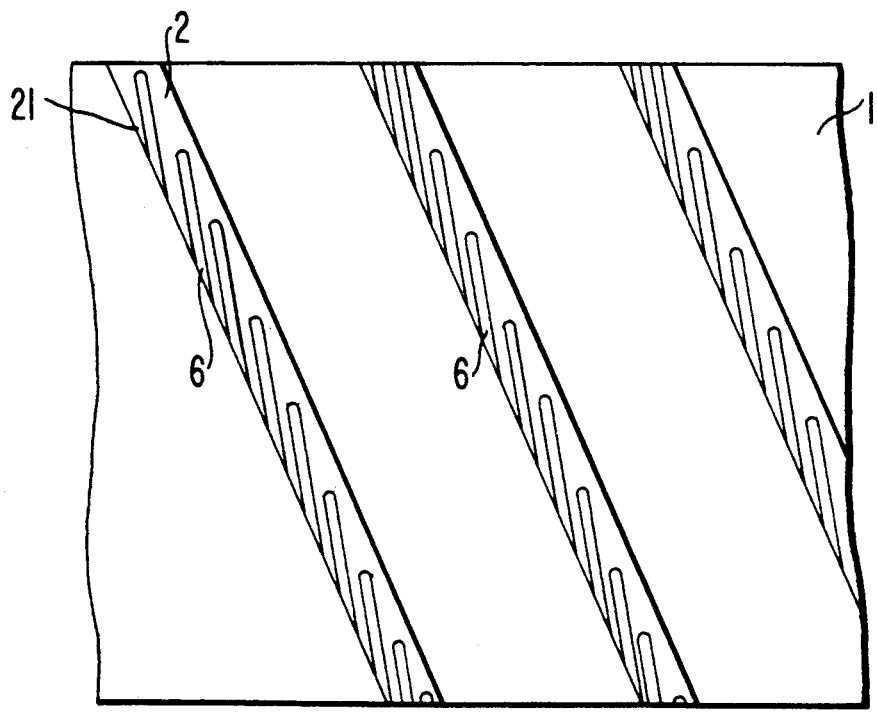
FIG. 14 is a developed view of the screw in FIG. 13.

A fifth preferred embodiment of the present invention is illustrated in FIGS. 13(a), 13(b) and 14 of side views and a developed view, respectively, in which a plurality of spaced-apart arcuately extending and aligned flat lands 6 and tapered lands 6' each consisting of an elongated, narrow and shallow groove are provided on a leading edge of the flight crest portion opened to the side of the front surface 21 of the flight.

Figure 15:
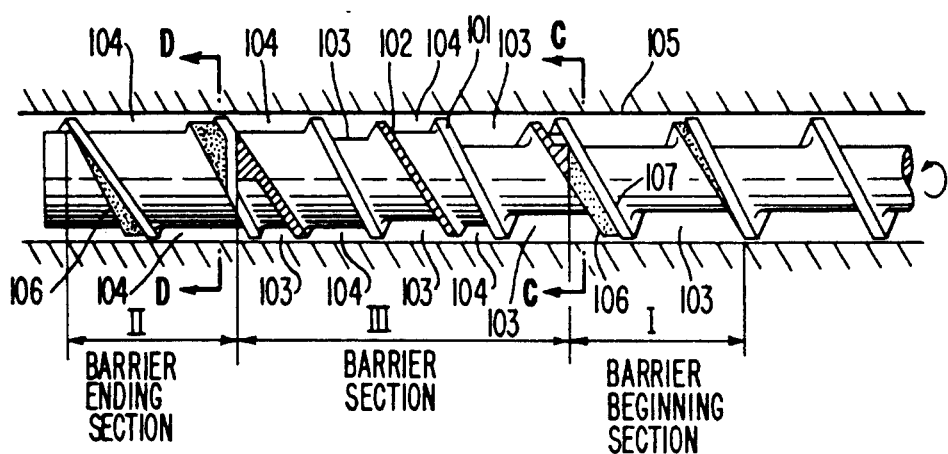
FIG. 15 is a side view showing an external appearance of a screw forming a principal portion of a barrier type plasticizing screw according to a sixth preferred embodiment of the present invention.

In the following, description will be made of further preferred embodiments of the present invention in connection with barrier type screws. FIG. 15 is a side view of a principal portion of a barrier type screw according to a sixth preferred embodiment of the present invention. In this figure, reference numeral 101 designates a main flight, numeral 102 designates a sub-flight (barrier flight), numeral 103 designates a solid groove, and numeral 104 designates a melt groove. In addition, in FIG. 15 reference symbol I designates a barrier beginning section, symbol II designates a barrier ending section, and symbol III designates a barrier section. A beginning section of a barrier means a part of the screw within a range in the axial direction of the screw for a distance equal to three times the diameter of the screw before and behind the end of the barrier flight or the connection between the main flight and barrier flight at the feed section side and an ending section of a barrier means a part of the screw within a range in the axial direction of the screw for a distance equal to three times the diameter of the screw before and behind the end of the barrier flight or the connection between the main flight and the barrier flight at the metering section side.

Figure 16B:
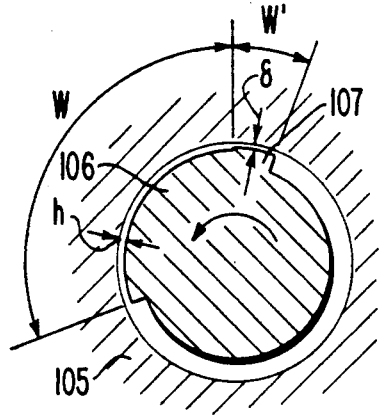
FIG. 16(b) is a cross-section view taken along line D—D in FIG. 15.
Figure 16A:
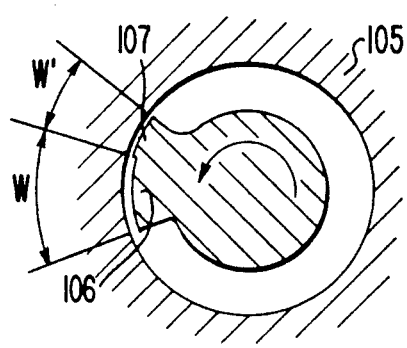
FIG. 16(a) is a cross-section view taken along line C—C in FIG. 15.
Figure 17:
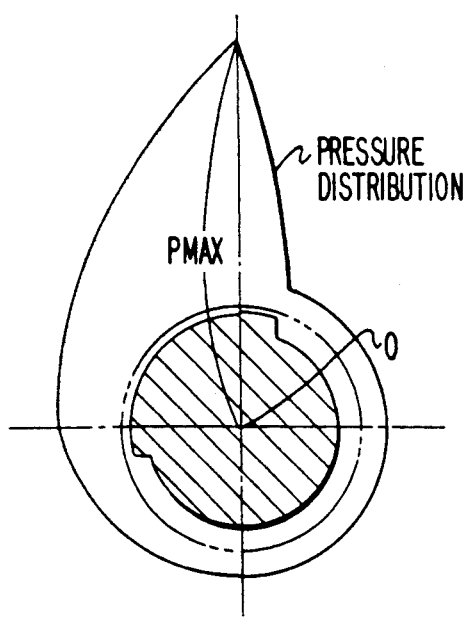
FIG. 17 is a diagram showing a mode of generation of a fluid lubrication force at a flight crest portion of a screw according to the present invention.

As shown in FIGS. 16(a) and 16(b) which are cross-section views taken along line C—C and line D—D, respectively, in FIG. 15, a size of an open space formed between an inner surface of a cylinder 105 and a screw flight crest portion in the barrier beginning portion and in the barrier ending portion, is varied in a step-like manner from a large open space to a small open space along the direction of rotation of the screw, and thereby a fluid lubrication pressure is generated as a result of rotation of the screw. A pressure acted upon the outer circumference of the screw in a cross-section indicated by line D—D in FIG. 15, is visually indicated in a polar diagram in FIG. 17. A distance from an orgin 0 of the diagram in FIG. 17 represents a pressure. The magnitude of the fluid lubrication pressure, that is, the highest pressure in FIG. 17 is determined by a step height h of a flight, a gap distance δ between a flight top 107 and an inner surface of a cylinder 105, a ratio in width W/W' (which is greater than 1 since, as shown in FIGS. 16(a) and 16(b), W is larger than W' and consequently W is greater than ½ the total of W+W') of a low flight portion 106 to a high flight portion, that is, a flight top portion 107, a viscosity of resin in these portions, and a rotational speed of a screw. Assuming that the ratio in width W/W' is the same, if the entire width (W+W') of the flight is increased, the maximum value $P_{max}$ of the fluid lubricant pressure is increased nearly in proportion to this entire width of the flight, an area subjected to the pressure is also increased nearly in proportion to the entire width, after all, the fluid lubrication force would be increased nearly in proportion to a square of the entire flight width, therefore increase of the entire flight width is effective for increase of a loading capability, and it is preferable that the length of the flight portion having a large entire flight width is also made as long as one-half the circumference of the screw or more. It is to be noted that under a general operating condition for common resin, in view of a magnitude of the lubrication pressure, a height of the step should be preferably chosen to be 1 mm or less.

Figure 18:
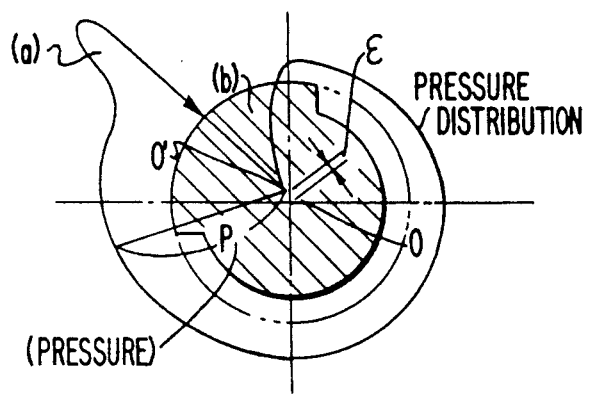
FIG. 18 is a diagram showing a mode of generation of a fluid lubrication force at a flight crest portion of a screw in the prior art.

In this connection, in the case of the flight crest portion configuration in the prior art, it was difficult to obtain a high loading capability because the pressure generated at the flight crest portion produces, in addition to a fluid lubrication force (a) in the direction of reducing an eccentricity (an eccentric distance: $\epsilon$) of the screw, also produces a negative fluid lubrication force (b) thus enhancing eccentricity of the screw, as shown in FIG. 18.

Furthermore, while there may occur a phenomenon in that simultaneously with rotational motion of the screw, the axis of the screw revolves in an eccentric state, in the case of the screw according to the present invention, when such phenomenon occurs, the fluid lubrication effect would greatly serve to correct the eccentric vibration.

Figure 19:
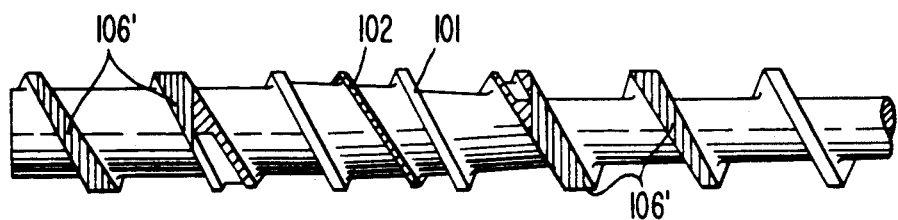
FIG. 19 is a side view of a screw according to a seventh preferred embodiment of the present invention.
Figure 20:
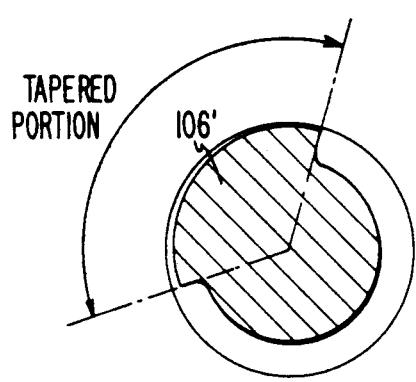
FIGS. 20 and 21 are transverse cross-section views respectively showing two alternative cross-section configurations at a tapered flight portion of the screw in FIG. 19.
Figure 21:
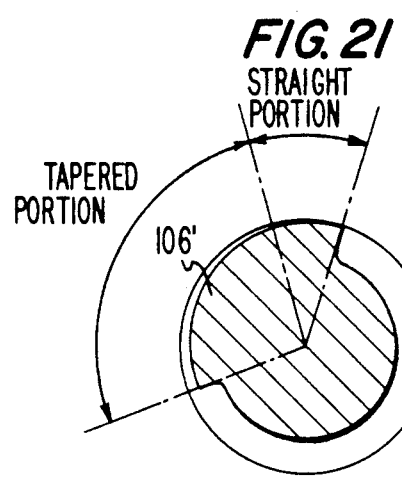
Figure 23:
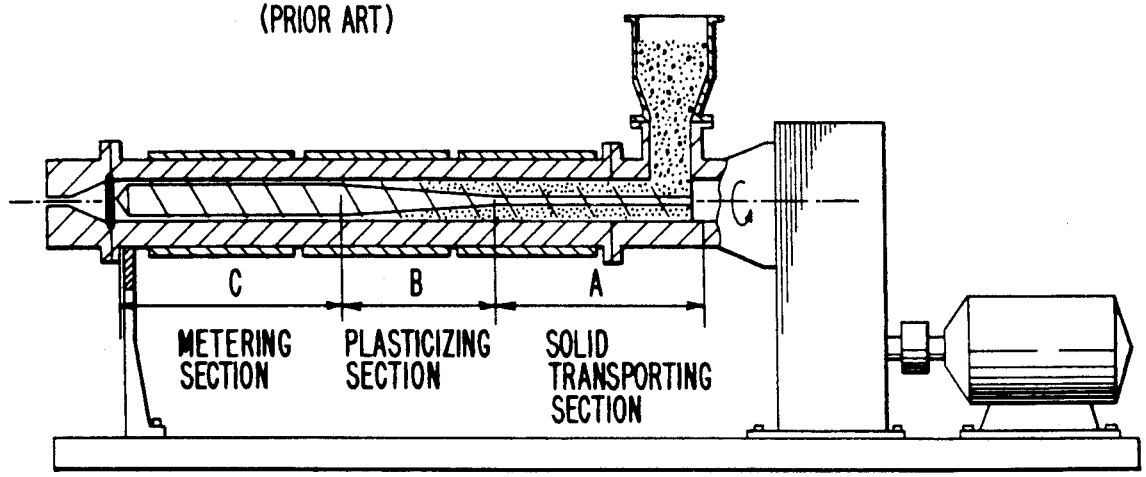
FIG. 23 is a side view partly in cross-section of an extruder in the prior art.
Figure 24:
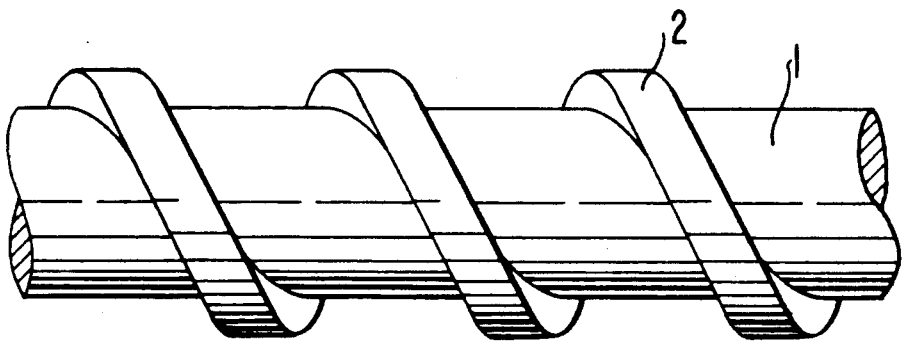
FIG. 24 is a side view of a full flight screw in the prior art.
Figure 25:
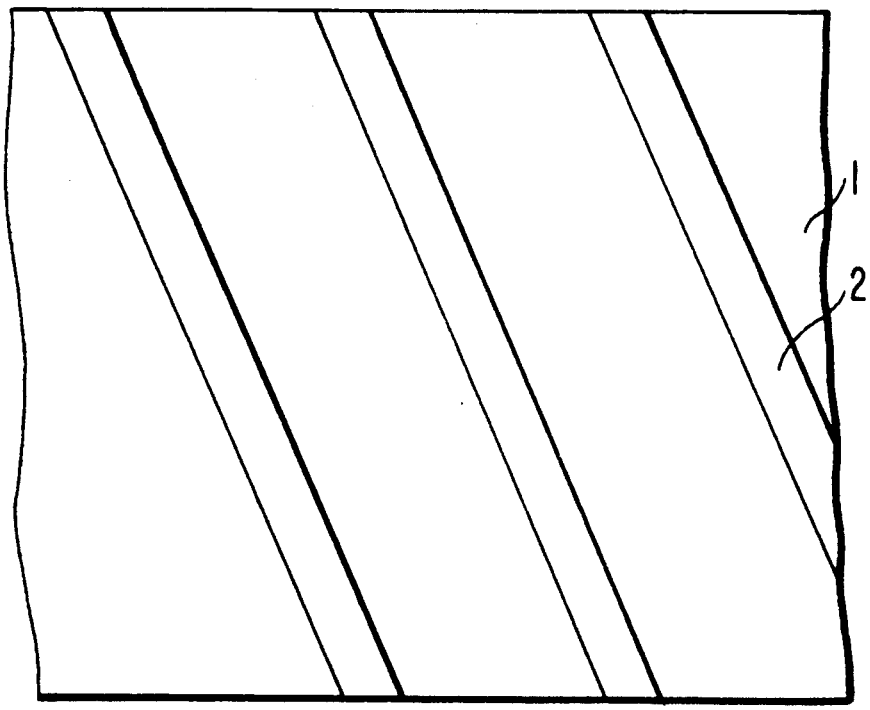
FIG. 25 is a developed view of the screw in FIG. 24.

While a flight crest portion configuration of step-like shape was illustrated in FIG. 15, even if a crest portion configuration of tapered height variation as shown in FIGS. 20 and 21 designated by reference numeral 106' is employed, the effect is the same. A side view of a screw having transverse cross-sections shown in FIGS. 20 and 21, respectively, is shown in FIG. 19.

Figure 22:
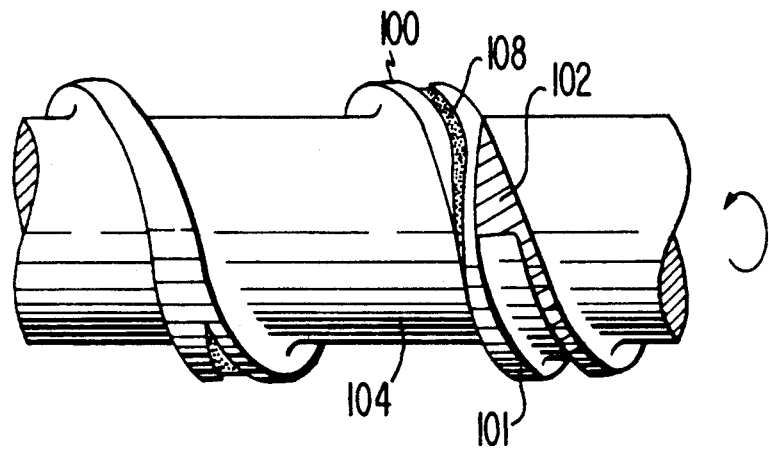
FIG. 22 is a side view showing a part of a screw according to an eighth preferred embodiment of the present invention.
Figure 26A:
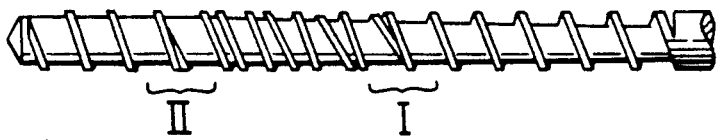
FIGS. 26(A), 26(B), 26(C), 26(D) and 26(E) are side views of various barrier type screws in the prior art.
Figure 26B:
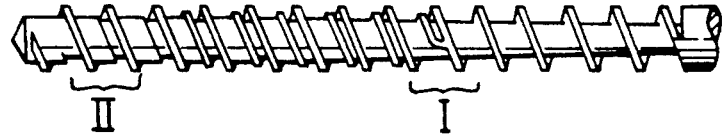
Figure 26C:
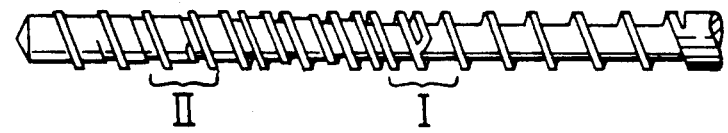
Figure 26D:
Figure 26E:
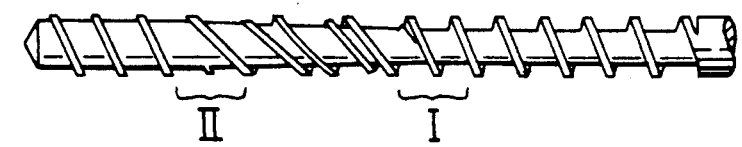
Figure 27A:
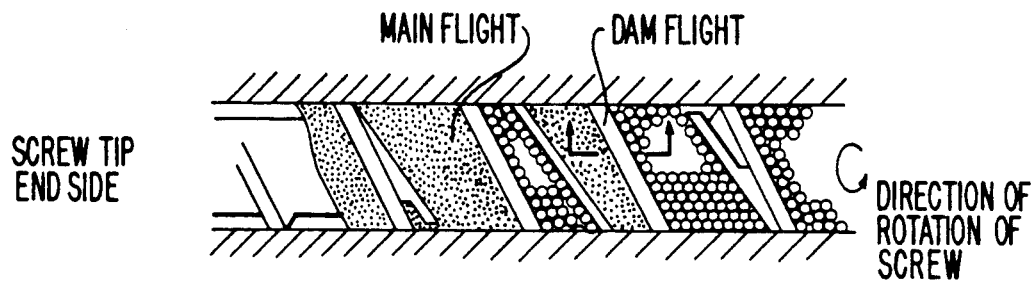
FIGS. 27(a) and 28 are schematic views showing a separated state of solid phase resin and liquid phase resin in a common barrier type screw.
Figure 27B:
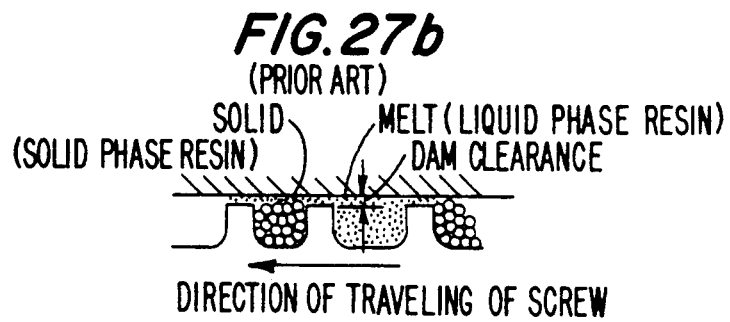
FIG. 27(b) is a cross-section view taken along line E—E in FIG. 27(a)
Figure 28:
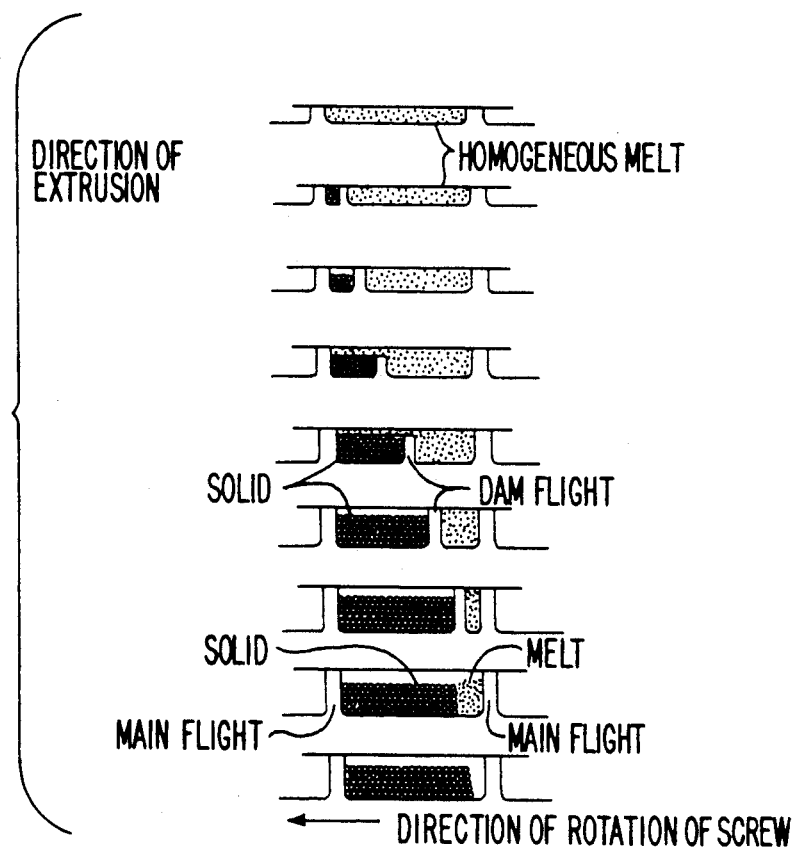
Figure 29:
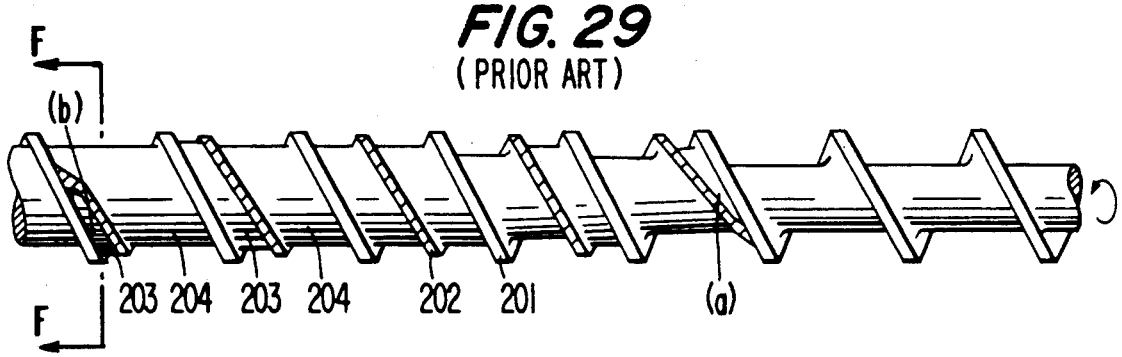
FIG. 29 is a side view of a barrier type screw in the prior art.
Figure 30:
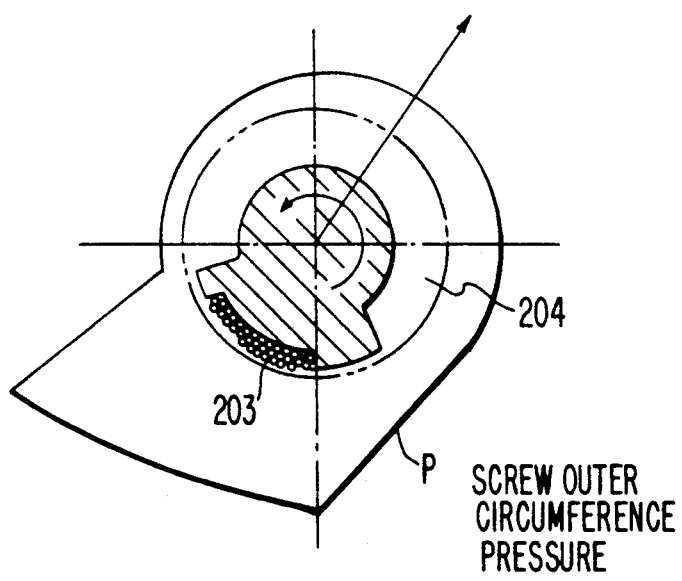
FIG. 30 is a resin pressure distribution diagram along a cross-section plane indicated by line F—F in FIG. 29.

FIG. 22 shows another example of a mechanism for generating a fluid lubrication pressure at a broad width flight portion in a barrier ending portion, in which a shallow introduction groove 108 for introducing molten resin from a melt groove 104 is provided in a dead-end shape on the broad width flight portion 100. Even with such configuration, a fluid lubrication effect can be equally obtained.

As described in detail above, due to the novel feature of the present invention described previously, even under an operating condition of a screw where a lubrication pressure is hardly generated with the flight configuration in the prior art, in the plasticizing screw according to the present invention a lubrication pressure can be generated between the screw crest portion and the cylinder wall surface, and thereby, direct contact between the flight crest portion and the cylinder wall surface can be prevented. As a result, a plasticizing screw which can perform stable extrusion without being accompanied by damage to a screw and a cylinder nor deterioration of extruded material even for various resins and even under various operating conditions, can be provided.

In addition, according to the present invention, in a barrier type plasticizing screw, biting abraision caused by pressure difference between a solid groove and a melt groove in a barrier beginning portion or in a barrier ending portion, can be prevented, and accordingly, a barrier type plasticizing screw having a high capability, can be provided. In addition, by broadening a solid width in a barrier ending portion, that is, by increasing a melting area in the form of melt film, a melting rate of resin can be promoted.

Since many changes and modifications in design can be made to the above-described construction without departing from the spirit of the present invention, all matter contained in the above description and illustrated in the accompanying drawings shall be interpreted to be illustrative and not as a limitation to the scope of the invention.

What is claimed is:

1. A plasticizing screw having means for generating lubricating pressure between a screw flight and a cylinder comprising a land formed in a crest portion of a screw flight of the plasticizing screw, the crest portion having a radially outermost peripheral portion extending continuously along the entire trailing edge of the screw flight, a helical line passing along the land lying in a cylinder having a diameter which is less than that of said radially outermost peripheral portion, the land having a width taken in a plane perpendicular to a rotation axis of the screw which is greater than one-half the overall circumferential width between leading and trailing surfaces of the crest portion of the screw flight, the land having a moderate inclination with respect to the outer diameter of the screw flight, a helical line passing along a terminal end of the land lying in a cylinder having a diameter equal to the outer diameter of the screw flight, the terminal end of the land being located between the leading and trailing surfaces of the screw flight, and the greatest depth to which said land extends in the crest portion being about 0.5 mm as measured radially inwardly from a radially outermost peripheral portion of the screw flight whereby the screw flight crest portion can be prevented from coming into contact with a cylinder wall surface upon rotation of the screw.

2. A plasticizing screw as claimed in claim 1, in which the land is opened on the side of the leading surface of the screw flight.

3. A plasticizing screw as claimed in claim 1, in which the land is provided at a central portion of the screw flight, the land being spaced inwardly from the leading and trailing surfaces of the screw flight.

4. A plasticizing screw as claimed in claim 3, in which a resin inflow port is provided on the leading surface of the flight.

5. A plasticizing screw as claimed in claim 3, in which the land comprises a plurality of spaced-apart sections thereof located along a helical periphery of the screw flight.

6. A plasticizing screw as claimed in claim 1, in which the land comprises a plurality of spaced-apart sections thereof located along a helical periphery of the screw flight.

7. The plasticizing screw as claimed in claim 6, wherein said sections have trailing edges opened on the helical periphery of the screw flight at locations spaced from the trailing surface of the screw flight such that the sections forming the land are not opened on the trailing surface of the screw flight.

8. The plasticizing screw as claimed in claim 1, wherein said comprises a plurality of aligned spaced-apart arcuately extending sections thereof, the sections extending from the leading surface and terminating between the leading and trailing surfaces of the screw flight.

9. A barrier type plasticizing screw having a main flight and a barrier flight having a somewhat smaller diameter than the main flight, said main flight having a land formed in a crest portion of the main flight, said land having a diameter which is less than that of the crest portion of the main flight, a helical line passing along the land over at least one pitch of the main flight lying in a cylinder having a constant diameter that is somewhat smaller than the diameter of the main flight whereby the main flight crest portion can be prevented from coming into contact with a cylinder wall surface upon rotation of the screw.

10. A plasticizing screw as claimed in claim 9, wherein said barrier screw includes a beginning section and an ending section, said land being provided in said main flight over at least one of the beginning section and the ending section of the barrier screw.

11. A plasticizing screw as claimed in claim 10, wherein said barrier screw includes a barrier section defined between said beginning section and said ending section, and
   of said beginning, said barrier and said ending sections, said land only being provided in at least one of said beginning section and said ending section.

12. A plasticizing screw having means for generating lubricating pressure between a screw flight and a cylinder comprising a land formed in a crest portion of a screw flight of the plasticizing screw, the crest portion having a radially outermost peripheral portion extending continuously along the entire trailing edge of the screw flight, the land having a diameter which is less than an outer diameter of the screw flight taken at said radially outermost peripheral portion, the land having a width taken in a plane perpendicular to a rotation axis of the screw which is greater than one-half the overall width between leading and trailing surfaces of the crest portion of the screw flight, a helical line passing along the land over at least one pitch of the screw flight lying in a cylinder having a constant diameter that is somewhat smaller than the outer diameter of said radially outermost peripheral portion, and the greatest depth of each said at least one recess in the crest portion being about 0.5 mm as measured radially inwardly from said radially outermost peripheral portion.

13. A plasticizing screw as claimed in claim 12, in which said at least one recess comprises a plurality of recesses, a plurality of spaced-apart sections of the land located along the helical periphery of the screw flight respectively defining the bottoms of said recesses.

14. The plasticizing screw as claimed in claim 13, wherein said sections have trailing edges opened on the helical periphery of the screw flight at locations spaced from the trailing surface of the screw flight such that the sections forming the land are not opened on the trailing surface of the screw flight.

15. The plasticizing screw as claimed in claim 12, wherein said at least one recess comprises a plurality of recesses defining a plurality of aligned spaced-apart arcuately extending sections of the land, the sections extending from the leading surface and terminating between the leading and trailing surfaces of the screw flight.

16. A plasticizing screw as claimed in claim 12, in which the land is opened on the side of the leading surface of the screw flight.

17. A plasticizing screw as claimed in claim 12, in which the land is provided at a central portion of the screw flight, the land being spaced inwardly from the leading and trailing surfaces of the screw flight.

18. A plasticizing apparatus comprising a cylinder and a plasticizing screw having a screw flight disposed within said cylinder, said plasticizing screw having means for causing lubricating pressure to be generated between the screw flight and the cylinder that is sufficient to inhibit said screw from coming in contact with said cylinder when material to be plasticized is disposed in said cylinder and said screw is rotated, said means for causing lubricating pressure to be generated comprising a land formed in a crest portion of the screw flight of the plasticizing screw, the crest portion having a radially outermost peripheral portion extending continuously along the entire trailing edge of the screw flight, the land having a diameter which is less than an outer diameter of the screw flight taken at said radially outermost peripheral portion, the land having a width taken in a plane perpendicular to a rotation axis of the screw which is greater than one-half the overall width between leading and trailing surfaces of the crest portion of the screw flight, a helical line passing along the land over at least one pitch of the screw flight lying in a cylinder having a constant diameter that is somewhat smaller than the outer diameter of said radially outermost peripheral portion, and the greatest depth of each said at least one recess in the crest portion being about 0.5 mm as measured radially inwardly from said radially outermost peripheral portion.

19. A plasticizing apparatus as claimed in claim 18, in which said at least one recess comprises a plurality of recesses a plurality of spaced-apart sections of the land located along the helical periphery of the screw flight respectively defining the bottoms of said recesses.

20. A plasticizing apparatus as claimed in claim 19, wherein said sections have trailing edges opened on the helical periphery of the screw flight at locations spaced from the trailing surface of the screw flight such that the sections forming the land are not opened on the trailing surface of the screw flight.

21. A plasticizing apparatus as claimed in claim 18, wherein said at least one recess comprises a plurality of recesses defining a plurality of aligned spaced-apart arcuately extending sections of the land, the sections extending from the leading surface and terminating between the leading and trailing surfaces of the screw flight.

22. A plasticizing apparatus as claimed in claim 18, in which the land is opened on the side of the leading surface of the screw flight.

23. A plasticizing apparatus as claimed in claim 18, in which the land is provided at a central portion of the screw flight, the land being spaced inwardly from the leading and trailing surfaces of the screw flight.

24. A plasticizing apparatus comprising a cylinder and a plasticizing screw having a screw flight disposed within said cylinder, said plasticizing screw having means for causing lubricating pressure to be generated between the screw flight and the cylinder that is sufficient to inhibit said screw from coming in contact with said cylinder when material to be plasticized is disposed in said cylinder and said screw is rotated, said means for causing lubricating pressure to be generated comprising a land formed in a crest portion of the screw flight of the plasticizing screw, the crest portion having a radially outermost peripheral portion extending continuously along the entire trailing edge of the screw flight, a helical line passing along the land lying in a cylinder having a diameter which is less than that of said radially outermost peripheral portion, the land having a width taken in a plane perpendicular to a rotation axis of the screw which is greater than one-half the overall width between leading and trailing surfaces of the crest portion of the screw flight, the land having a moderate inclination with respect to the outer diameter of the screw flight, a helical line passing along a terminal end of the land lying in a cylinder having a diameter equal to the outer diameter of the screw flight, and the greatest depth to which said land extends in the crest portion being about 0.5 mm as measured radially inwardly from said radially outermost peripheral portion of the screw flight.

25. A plasticizing apparatus as claimed in claim 24, in which the land is opened on the side of the leading surface of the screw flight.

26. A plasticizing apparatus as claimed in claim 24, in which the land is provided at a central portion of the screw flight, the land being spaced inwardly from the leading and trailing surfaces of the screw flight.

27. A plasticizing apparatus as claimed in claim 26, in which the land comprises a plurality of spaced-apart sections thereof located along a helical periphery of the screw flight.

28. A plasticizing apparatus as claimed in claim 26, in which a resin inflow port is provided on the leading surface of the flight.

29. A plasticizing apparatus as claimed in claim 24, in which said at least one recess comprises a plurality of recesses, a plurality of spaced-apart sections of the land located along the helical periphery of the screw flight respectively defining the bottoms of said recesses.

30. A plasticizing apparatus as claimed in claim 29, wherein said sections having trailing edges opened on the helical periphery of the screw flight at locations spaced from the trailing surface of the screw flight such that the sections forming the land are not opened on the trailing surface of the screw flight.

31. A plasticizing apparatus as claimed in claim 24, wherein said at least one recess comprises a plurality of recesses defining a plurality of aligned spaced-apart arcuately extending sections of the land, the sections extending from the leading surface and terminating between the leading and trailing surfaces of the screw flight.

32. A plasticizing apparatus comprising a cylinder and a barrier type plasticizing screw disposed in said cylinder, said screw having a main flight, a barrier flight having a somewhat smaller diameter than the main flight, and means for causing lubricating pressure to be generated between said main flight and said cylinder that is sufficient to inhibit said screw from coming in contact with said cylinder when material to be plasticized is disposed in said cylinder and said screw is rotated, said means for causing lubricating pressure to be generated comprising a land formed in a crest portion of the main flight, said land having a diameter which is less than that of the crest portion of the main flight, and a helical line passing along the land over at least one pitch of the main flight lying in a cylinder having a constant diameter that is somewhat smaller than that of the main flight.

33. A plasticizing apparatus as claimed in claim 22, wherein said barrier screw includes a beginning section and an ending section, said land being provided in said main flight over at least one of the beginning section and the ending section of the barrier screw.

34. A plasticizing apparatus as claimed in claim 33, wherein said barrier screw includes a barrier section defined between said beginning section and said ending section, and of said beginning, said barrier and said ending sections, said land only being provided in at least one of the beginning section and the ending section.

* * * * *